(12) United States Patent
McBurney et al.

(10) Patent No.: US 8,514,128 B2
(45) Date of Patent: Aug. 20, 2013

(54) SATELLITE NAVIGATION RECEIVERS WITH SELF-PROVIDED FUTURE EPHEMERIS AND CLOCK PREDICTIONS

(75) Inventors: Paul W. McBurney, San Francisco, CA (US); Shahram Rezaei, Danville, CA (US); Kenneth U. Victa, San Francisco, CA (US)

(73) Assignee: eRide,. Inc., San Bruno, CA (US)

( * ) Notice: Subject to any disclaimer, the term of this patent is extended or adjusted under 35 U.S.C. 154(b) by 185 days.

(21) Appl. No.: 12/874,904

(22) Filed: Sep. 2, 2010

(65) Prior Publication Data

US 2012/0056782 A1 Mar. 8, 2012

(51) Int. Cl.
*G01S 19/27* (2010.01)
(52) U.S. Cl.
USPC .................................................. 342/357.66
(58) Field of Classification Search
USPC ........................................ 342/357.66, 357.77
See application file for complete search history.

(56) References Cited

U.S. PATENT DOCUMENTS

| 7,450,062 B2* | 11/2008 | McBurney et al. | 342/357.4 |
| 7,786,929 B2* | 8/2010 | Weng et al. | 342/357.66 |
| 2010/0060518 A1* | 3/2010 | Bar-Sever et al. | 342/357.12 |

FOREIGN PATENT DOCUMENTS

EP 2063284 A2 5/2009

* cited by examiner

*Primary Examiner* — Harry Liu
(74) *Attorney, Agent, or Firm* — Thomas E. Schatzel; Law Office of Thomas E. Schatzel, A Professional Corp.

(57) ABSTRACT

An improved extended ephemeris navigation receiver includes a fully autonomous satellite navigation receiver for receiving microwave transmissions from orbiting navigation system satellites, and able to demodulate navigation messages that include the ephemerides for those navigation system satellites. The improvements include a force model of the accelerations acting on a particular satellite vehicle, and are exclusive to the receiver. A single observation of the ephemeris for each SV is input and propagated days into the future by integrating each SV's orbital position with its corresponding force model. The fully autonomous satellite navigation receiver thereafter has available to it extended ephemeris predictions that can be used as substitutes when said navigation messages from the respective SV cannot otherwise be immediately obtained and demodulated.

15 Claims, 2 Drawing Sheets

Figure 1:
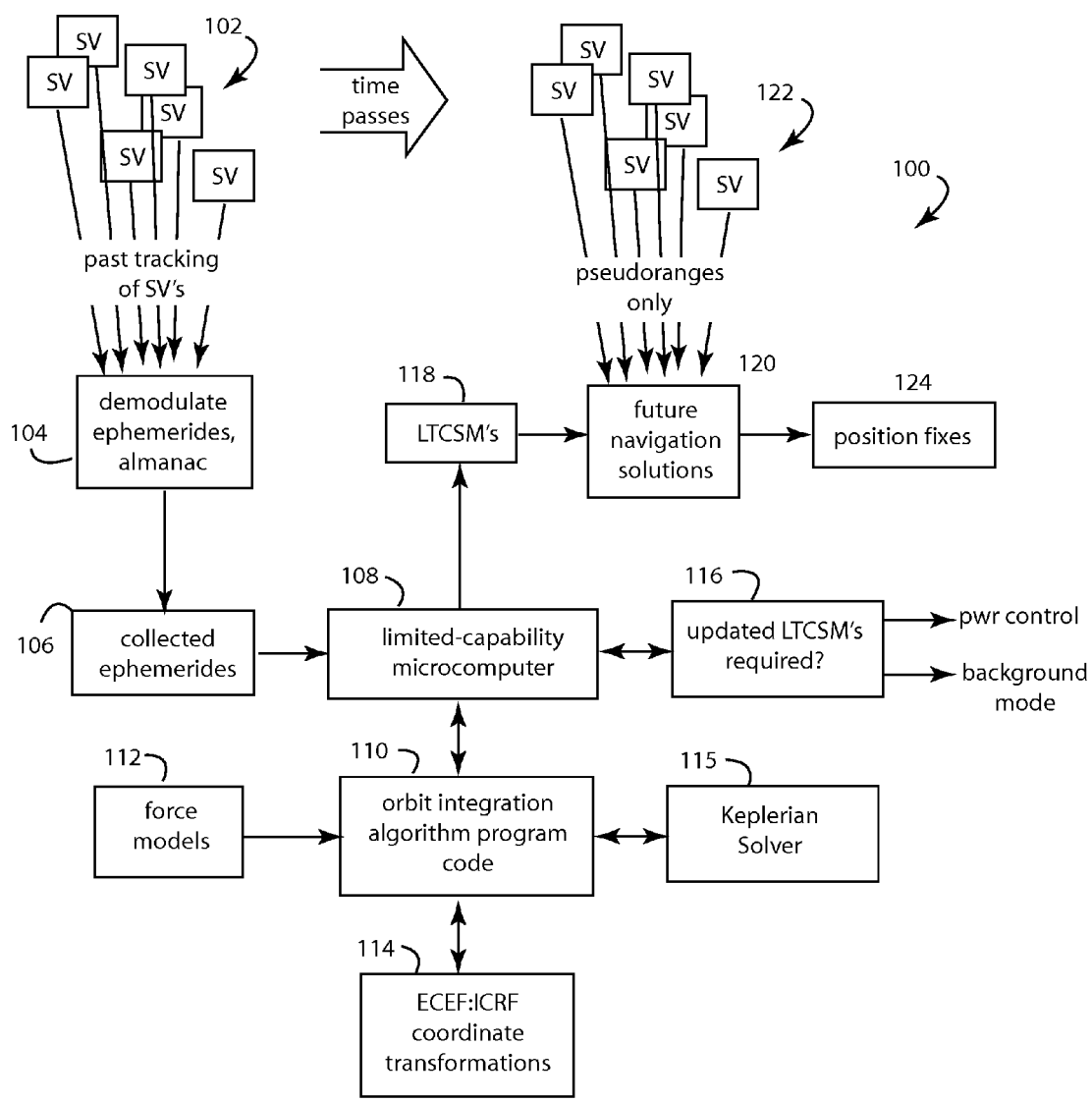

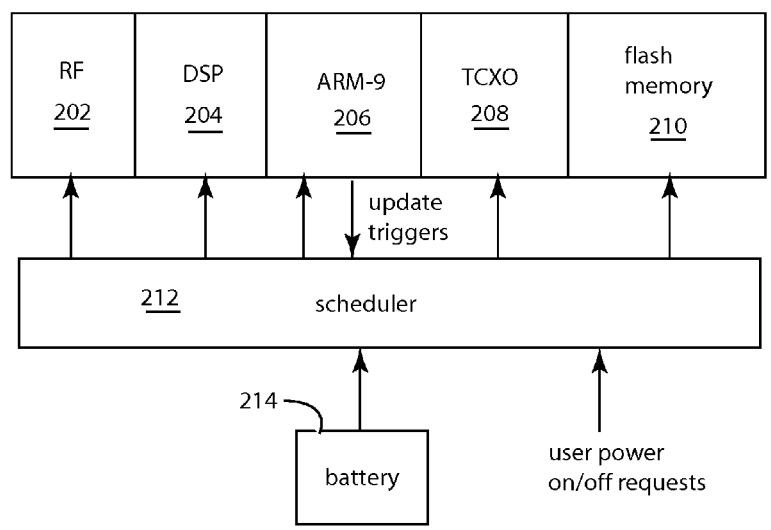
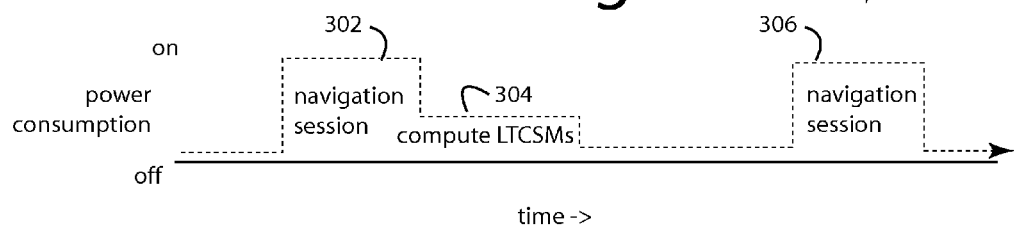

US 8,514,128 B2

SATELLITE NAVIGATION RECEIVERS WITH SELF-PROVIDED FUTURE EPHEMERIS AND CLOCK PREDICTIONS

BACKGROUND OF THE INVENTION

1. Field of the Invention

The present invention relates to navigation receivers, and in particular to receivers that can build their own long-term models of the global positioning system (GPS) satellite orbits and clocks.

2. Description of the Prior Art

Satellite navigation receivers, like those found everywhere for the Global Positioning System (GPS), depend on knowing the exact orbital positions of each satellite they are tracking in order to calculate the position of the receiver. Such ephemeris information is only periodically updated and it goes stale rather quickly.

Mobile phones and digital cameras now come routinely equipped with GPS navigation receivers that provide position fixes for their users and locations for the photographs taken. These embedded GPS navigation receivers are the assisted type (A-GPS) that can download satellite ephemeris and almanac data from network servers, and thus do not have to wait the usual long times otherwise needed to collect the information directly from the satellites themselves. However, network connections are not 100% reliable nor always available, especially for mobile users. Not having the satellite ephemeris and almanac data immediately available on a cold start can mean the time to a first fix can be unacceptably long.

In the GPS system, at least twenty-four satellites circling the earth at an attitude of 20,200 km are spaced in orbit such that a minimum of six satellites are in view at any one time to a user. Each such satellite transmits an accurate time and position signal. GPS receivers measure the time delay for the signal to reach it, and the apparent receiver-satellite distance is calculated from that. Measurements like this from at least four satellites allow a GPS receiver to calculate its three-dimensional position, velocity, and system time. The apparent distance also contains the time offset of the satellite and receiver time offset from the true GPS system time.

The solution to the receiver position depends on knowing where each of the relevant satellites are in three-dimensional space and the time offset from GPS time of each satellite. The respective positions are reported as parameters belonging to a set of Keplerian equations. In conventional GPS systems, the GPS ephemeris includes all the items in Table I.

TABLE I

| GPS Ephemeris Message | |
|---|---|
| Name | Symbol |
| Reference time of ephemeris | toe |
| Square root of semi major axis | $\sqrt{a}$ |
| Eccentricity | e |
| Inclination angle (at time toe) | i0 |
| Longitude of ascending node | $\Omega 0$ |
| Argument of perigee (at time toe) | $\omega$ |
| Mean anomaly (at time toe) | M0 |
| Rate of change of inclination angle | di/dt |
| Rate of change of Longitude of ascending node | $\dot{\Omega}$ |
| Mean motion correction | $\Delta n$ |
| Amplitude of cosine correction to argument of latitude | Cuc |
| Amplitude of sine correction to argument of latitude | Cus |
| Amplitude of cosine correction to orbital radius | Crc |
| Amplitude of sine correction to orbital radius | Crs |

TABLE I-continued

| GPS Ephemeris Message | |
|---|---|
| Name | Symbol |
| Amplitude of cosine correction to inclination angle | Cic |
| Amplitude of sine correction to inclination angle | Cis |

During the period of validity of the ephemeris message, it is possible to compute the near exact position and velocity of a satellite and its clock (time) offset from GPS time at any one instant in its flight using the complete GPS ephemeris message information downloaded to the navigation receiver. This of course presumes the GPS ephemeris message can be downloaded.

The computed positions of the GPS satellites are very sensitive to small variations of most of these parameters, so it is necessary to fully communicate them during each ephemeris download. But, as described in United States patent application, US 2005/0278116 A1, published Dec. 15, 2005, it has also been observed that the two harmonic corrections to inclination angle, Cic and Cis, are not so critical. eRide, Inc. (San Francisco, Calif.), at least, communicates "compact" satellite models in which one of these two parameters are set to zero and not used in the computation of satellite position. The solution accuracy is not significantly degraded. The second order clock time offset has little impact as well and can be ignored.

It takes a GPS navigation receiver a minimum of 12.5 minutes of continuous operation to be able to collect the complete almanac and ephemeris describing all the orbiting satellites and their trajectories. There is a lot of data, and the 50-Hz modulation used to transfer this information (navData) is very slow. The signal strength at the receivers must also be good in order to be able to demodulate the navData subcarriers. So a lack of time and/or a lack of strong signal can frustrate a user trying to get a quick first position fix.

Conventional receivers solve this problem by storing the almanac data in previous operational sessions. Thereafter, currently collected ephemeris data is compared to the stored almanac data to determine what needs to be updated. So a rather complete and updated almanac is built up and maintained at the receiver itself that is instantly available at future warm starts. Thus, after considering the acquisition time, the time to first fix of a new GPS session is dependent mainly on the time to collect the ephemeris.

Conventional satellite ephemeris data from network servers goes stale rather quickly, so A-GPS navigation receivers need to connect with their servers at least daily. The typical line-of-sight ranging accuracy degrades over twenty-five meters within four hours after the center time-of-ephemeris (toe) of the normally accepted applicability window. Currently, GPS satellites broadcast a new ephemeris every two hours, and the time-of-ephemeris is one hour in the future at the cutover to the new model. Since the GPS satellites move in twelve hours orbits, using models from a previous session will generally allow position fixes only five hours after the last session. These fixes degrade if the number of visible satellites involved drops to three or less. Given the realities of the ways mobile phones and cameras are used, connecting to the server every day may not be possible or practical.

Other extended assistance techniques have evolved beyond real-time assisted GPS techniques. Instead of waiting on the actual ephemeris information being received from the satellites flying overhead, a synthetic equivalent is predicted and pre-loaded. Such prediction information, or "extended ephemeris," is an estimate of a satellite's future ephemeris that can be good for up to a week. When synthetic assistance is available on a device, the GPS startup times can be significantly reduced compared to real-time assistance techniques, since no server transaction is required.

Two kinds of extended ephemeris solutions are now conventional, network enabled and fully autonomous. Network enabled solutions require a periodic data download from a prediction server. Fully autonomous solutions do not need network support, they learn and generate their own synthetic assistance from their own satellite observations.

Fully autonomous solutions have sometimes inconvenient limitations, they can only predict data for the satellites they have actually seen and may require multiple observations that have close time proximity. This means the availability of extended models is dependent on how often the receiver is used and thus requires higher power consumption. With autonomous models, the data derived is usable for up to three days before the accuracy degrades too much. Network enabled solutions provide longer and more accurate predictions, sometimes up to ten days or two weeks for entire constellations.

Although extended ephemeris solutions have become commercially available, they have remained strictly proprietary to each chipset vendor who implemented the feature. Chipset proprietary network enabled solutions usually compute the prediction data on a server, then periodically download to the portable device. These server-based prediction techniques generally impose substantial weekly data payloads, typically fifty to eighty kilobytes per constellation. For applications where broadband data connectivity may be problematic or too costly, such overhead can be prohibitive.

What is needed are compact long-term models of the GPS satellite orbits and clocks that can be computed by GPS receiver with limited computing capabilities and little or no network access and do not place special requirements on the time proximity of observed ephemeris in order to generate extended models.

SUMMARY OF THE INVENTION

Briefly, an improved extended-ephemeris navigation receiver has a fully-autonomous satellite navigation receiver for receiving microwave transmissions from orbiting navigation system satellites, and is able to demodulate navigation messages that contain the ephemerides for those navigation system satellites. The improvements include a force model of the accelerations acting on a particular satellite vehicle, and is exclusive to the receiver. The force model also requires a transformation model that allows conversion between earth inertial frame and the earth-centered-earth-fixed coordinate frame so that all forces can be integrated in their intrinsic frame of reference. A single observation of the ephemeris for each SV is input and propagated days into the future by integrating each SV's orbital position with its corresponding force model. In order to reduce the storage of the propagated data and simplify usage in the receiver processing, the generated orbits are sampled and converted into long term Keplerian ephemeris format similar to the GPS broadcast ephemeris and then stored in non-volatile memory. The fully autonomous satellite navigation receiver thereafter has available to it extended ephemeris predictions that can be used as substitutes when said navigation messages from the respective SV cannot otherwise be immediately obtained and demodulated.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a functional block diagram of a fully autonomous extended ephemeris GPS navigation receiver embodiment of the present invention;

FIG. 2 is a functional block diagram of a satellite navigation receiver embodiment of the present invention showing the power control that can be applied to various hardware stages in support of long-term compact satellite model (LTCSM) updating; and FIG. 3 is a graph representing the times a satellite navigation receiver embodiment of the present invention can be required by a user and how the processing of updates for the LTCSM library can be scheduled.

DETAILED DESCRIPTION OF THE PREFERRED EMBODIMENT

FIG. 1 represents fully autonomous extended ephemeris GPS navigation receiver embodiment of the present invention, and is referred to herein by the general reference numeral 100. Over time, continually varying constellations of all the orbiting GPS satellite vehicles (SV's) 102 transmit microwave signals that include their then-up-to-date respective ephemerides. A processor 104 demodulates each of these ephemerides and the almanacs that include them as is possible over days and even weeks. A complete collection 106 of the ephemerides and the almanacs is then available in an on-going basis to a limited-capability microcomputer 108.

A GPS Navigation Message transmitted by each SV 102 includes parameters to describe the GPS satellites positions, clock offsets, and other system parameters. The Navigation Message comprises twenty-five data frames that are each divided into five sub-frames of 300-bit sequences transmitted at 50-bits per second. Each sub-frame therefore requires six seconds, each frame thirty seconds, and the entire set of twenty-five frames takes twelve and a half minutes to completely receive. Sub-frames number one, two, and three are reserved for complete orbit and clock descriptions, and other messages about the satellite that is transmitting them. Sub-frames four and five carry the abbreviated orbit and clock data for all the satellites and system data common to all the satellites. The GPS receivers align the data bits, check them for errors with a parity algorithm, separate them into sets representing particular parameters, scale them, convert the bits into numeric formats and specific units. For example, meters, meters squared, semi-circles, radians, seconds, seconds per second, seconds per second per second, and weeks. Each parameter provides the basis needed by the GPS receiver to derive the position and time estimates. Various algorithms needed are specified in Naystar GPS Joint Program Office, Interface Control Document ICD-GPS-200C.

Ordinarily, the computation of long term compact satellite models (LTSCM) requires high performance computer processors with double-precision mathematics coprocessors. This is because conventional satellite force acceleration models and coordinate transformations must be computed very precisely every few seconds such that integration error does not grow unbounded. The computations must be made for every SV 102 and every 6-12 hour period for at least a week into the future. The kinds of processors used in conventional satellite navigation receivers and smart phones are simply not capable of such performance, and mobile devices are further very intolerant of the high levels of battery power draw that result during such calculations.

A special orbit integration algorithm program code 110 is provided to the limited-capability microcomputer 108 that applies a corresponding force model 112 to project each of the collected ephemerides out into the future. Only a single observation of the ephemeris for each SV is used in each of the corresponding SV-projections, e.g., the last good ephemeris demodulated and verified for that SV. Such approach reduces the computational load and more importantly, reduces the amount of time a receiver must be on and collecting ephemeris. Such a single point observation nevertheless provides high quality extended ephemeris information that can be useful 7-10 days into the future. This is because the acceleration forces acting on each SV dominate all the other causes of orbital deviations. The orbital projections are structured for output as Keplerian-based long term compact satellite models (LTCSM's) for use in the future when the corresponding SV's are encountered again and no real-time ephemeris demodulation is possible.

In general, the orbit integration equations for embodiments of the present invention resemble those used to compute long term compact satellite models (LTCSM) on a server. But some equations must be simplified in order to reduce the calculation loads and times when executed on relatively modest, fully autonomous satellite navigation receivers. Additionally, some parameters such as the size of solar panels and weight of each satellite are assumed to be the same for each spacecraft, and this reduces the need to provide external input data that is not available in the normal navigation data.

A coordinate transformation program code 114 is provided to the limited-capability microcomputer 108. Two coordinate systems are used in the orbit integration calculations, e.g., (1) International Celestial Reference Frame (ICRF, aka ICRS), and (2) Earth-Centered, Earth-Fixed (ECEF), also known as WGS-84, International Terrestrial Reference Frame (ITRF), and ITRS. The origin in ICRF is placed at the Solar System's center of gravity (e.g., barycenter), the point where the gravitational forces exerted by all the Solar System bodies cancel. Its axis directions are "space fixed". The origin in the ECEF system is placed at the center of the mass of the Earth. Its x-axis is the intersection of the mean equator, and the mean prime meridian, and the z-axis is the mean spin axis of the earth between 1900 until 1905, The coordinate transformation of ECEF to ICRF, and ECEF to ICRF, comprises four quaternion rotations. Each quaternion has four elements and is very efficient in doing matrix rotation operations, e.g., $$U(t) = \pi^{conj} \times \frac{d(\theta)}{dt} \times (N \times P),$$

P—Precession;
N—Nutation
   θ—Earth rotation
   π—Polar motion; and
Superscript "conj" abbreviates the conjugate of the quaternion.

Four rotation matrices that can be used in embodiments of the present invention are described in detail by, Oliver Montenbruck and Eberhard Gill, in their book: *Satellite Orbits: Models, Method, Applications*, first edition 2000, p. 66, ISBN: 978-3-540-67280-7. For transformations from ECEF to ICRF, four quaternion rotations are employed in the coordinate transformation program code 114, $$U(t) = (N \times P)^{conj} \times \frac{d(\theta)}{dt} \times (\pi)^{conj}.$$

The Polar motion rotation quaternion is based on Earth Orientation Parameters, so-called EOP. These parameters are predicted by using 10-years forecasts, for example using those provided by the United States Navy at maia.usno.navy.mil/ser7/ser7.dat (IERS BULLETIN—A, Rapid Service/Prediction of Earth Orientation). Improper modeling of the EOP can result in increasingly larger error as the integration time increases. These EOP parameters are sinusoidal in nature but with randomly changing phase and amplitude. Using a value that is wrong by half cycle can lead to an error on the order of 200-meters after 3 days. The contributed observations used in the preparation of the Bulletin are available at www.usno.navy.mil/USNO/earth-orientation/eo-info/general/input-data. The contributed analysis results are based on data from Very Long Baseline Interferometry (VLBI), Satellite Laser Ranging (SLR), the Global Positioning System (GPS) satellites, Lunar Laser Ranging (LLR), and meteorological predictions of variations in Atmospheric Angular Momentum (AAM). Thus, the accuracy of the self ephemeris may degrade slowly after the expected usability range of the EOP model. In this case, the user can request to re-flash the receiver software, or input a new set of EOP parameter via special input command. The forward EOP prediction model is good for more than ten years and has a slowly degrading accuracy beyond the ten years.

The structure and coefficients of the x and y coefficients of the currently published EOP transformation are as follows:

$x=0.0972+0.1154 \cos A+0.0380 \sin A-0.0411 \cos C+0.0729 \sin C;$ $y=0.3418+0.0313 \cos A-0.1043 \sin A+0.0729 \cos C+0.0411 \sin C;$ $UT1-UTC=-0.0677-0.00081(MJD-55435)-(UT2-UT1)$ where $A=2*pi*(MJD-55427)/365.25$ and $C=2*pi*(MJD-55427)/435$; and MJD is a well-known Modified Julian Date time frame.

Four acceleration forces are integrated in the ICRF coordinate system: earth gravity, moon gravity, sun gravity, and sun solar radiation. These are calculated every three seconds by limited-capability microcomputer 108, and the results are used to propagate the position and velocity of the respective SV's 102. It is important to model all four of the forces, even though the earth gravity clearly dominates. The effects of the other forces are nevertheless significant. For example, not modeling the Sun Solar radiation force can result in 20-30 meters of error in only three days. Whereas, a one second integration period would lead to higher accuracy, a three second integration time was chose as the best compromise of accuracy and computation time.

One method that can be used to calculate acceleration due to Earth gravity is described by Oliver Montenbruck and Eberhard Gill, in *Satellite Orbits: Models, Method, Applications*. The Sun and Moon gravitational forces calculations can be based on Newton's law of universal gravitation. See, http://en.wikipedia.org/wiki/

Newton%27s_law_of_universal_gravitation, i.e., acceleration applied to an object in space from a heavy body is equal to, $$a\_gravity = G*M\_heavy\_body/r^2;$$

where, G is gravitational constant and M_heavy_body is the mass of Sun and Moon (also a constant). The "r" is the distance between heavy object and satellite The position of the Sun and Moon is calculated by force models 112 and limited-capability microcomputer 108 every ten minutes and use same calculated location within ten minutes. The Sun and Moon calculations are heavy, and so the calculations are not repeated at every step in the integration. A ten minute rate has been observed to be optimal in terms of trade-off between accuracy and computation time.

The Sun Solar radiation is also calculated by force models 112 and limited-capability microcomputer 108, for example, using a model suggested by Henry F. Fliegel and Thomas E. Galini, *Solar Force Modeling of Block IIR Global Positioning System Satellites*, Journal of Spacecraft and Rockets, Vol. 33, No. 6, p. 863-866, 1996. An angle β is computed as the angle between the Sun-Earth line and the SV's orbital plane, e.g., a vector "r" and vector "r–rSun".

The Solar radiation forces are calculated by scaling the mass of SV to get final accelerations. The Sun solar radiation is the only force in which the weight and area of the solar panels of the SV matters. There are currently two types of GPS satellites that are operational, block II-A and block II-R:

Block II-A SV's: mass=984.5 kg, area=8.133 m^2; and
Block II-R SV's: mass=1100 kg, area=17.66 m^2.

Block II-A GPS satellites are being continually replaced with Block II-R satellites. When each replacement occurs, such information will not ordinarily be available to the receiver. However, experiments have shown that the physical parameters of Block II-R satellites can be assumed for all the SV's (including II-A) without significant adverse impact on receiver position solutions.

A numerical method is used to integrate all the acceleration forces. Given a satellite state vector "r" in ICRF frame at time "T", "r" has six components, three for position and three for velocity. In order to estimate state vector "r" at a time "T+dT", where dT is step size of the integration and is six seconds in embodiments of the present invention. Choosing six seconds results in optimal performance in terms of acceptable position accuracy and reduced calculation time.

The orbit integration algorithm program code 110 provided to the limited-capability microcomputer 108 includes a Bulirsch-Stoer type algorithm. (See, en.wikipedia.org/wiki/Bulirsch-Stoer_algorithm.) Such algorithm is a method for the numerical solution of ordinary differential equations which combines Richardson extrapolation, the use of rational function extrapolation in Richardson-type applications, and a modified midpoint method, to obtain numerical solutions to ordinary differential equations (ODEs) with high accuracy and comparatively little computational effort. It is sometimes called the Gragg-Bulirsch-Stoer (GBS) algorithm because of the importance of a result about the error function of the modified midpoint method.

Richardson extrapolation considers a numerical calculation whose accuracy depends on the used step size h as an unknown analytic function of the step size h, performing the numerical calculation with various values of h, fitting a chosen analytic function to the resulting points, and then evaluating the fitting function for h=0, thus approximating the result of the calculation with infinitely fine steps.

The Bulirsch-Stoer type algorithm uses rational functions as fitting functions for Richardson extrapolation in numerical integration, and is superior to using polynomial functions. Rational functions are able to approximate functions with poles rather well, compared to polynomial functions, given that there are enough higher-power terms in the denominator to account for nearby poles. While a polynomial interpolation or extrapolation only yields good results if the nearest pole is relatively far outside a circle around the known data points in the complex plane, rational function interpolation or extrapolation can remarkably accurate even in the presence of nearby poles.

The included modified midpoint method has the advantage of requiring only one derivative evaluation per substep. The error of a modified midpoint step of size H, consisting of n substeps of size h=H/n each, and expressed as a power series in h, contains only even powers of h. This makes the modified midpoint method useful with the Bulirsch-Stoer method, because the accuracy increases two orders at a time when the results of separate attempts to cross the interval H with increasing numbers of substeps are combined.

Although the Bulirsch-Stoer type algorithm included in orbit integration algorithm program code 110 can be expected to provide solutions after completing several different steps, in practice only two steps are required for embodiments of the present invention. So, for a six-second integration sampling rate, accelerations need only be computed every three seconds. Thus the extrapolation stage of the Bulirsch-Stoer method is unnecessary in the application of FIG. 1.

The integration process for embodiments of the present invention therefore reduces to the following steps:

--- dT = 6 seconds
h = dT/2 = 3 seconds
1) Calculate Acceleration at beginning, mid, and end points of the six seconds internal:
    A1 = Accel(T) = totalAcceleration (T, r(T));
    r_est(T + h) = r(T) + h * A1;
    A2 = Accel(T + h) = totalAcceleration (T+h, r_est(T + h));
    r_est(T + dT) = r(T) + dT * A2;
    A3 = Accel(T + dT) = totalAcceleration (T + dT, r_est(T + dT));
2) Calculate state at T+dT, as following:
    r(T + dT) = 0.5 * (r_est(T + h) + r_est(T + dT) + h*A3).

---

Returning to FIG. 1, a Keplerian Solver 115 provides the executable program code that is needed by the limited-capability microcomputer 108 to compute estimates for the fifteen Keplerian parameters in, $$\vec{X} = [a, e, i0, M0, \Delta n, di/dt, \omega, \Omega 0, \dot{\Omega}, Crs, Crc, Cus, Cuc, Cis, Cic].$$

These are equivalent to the ephemeris parameters that best fit a series of satellite X-Y-Z position samples in the ECEF coordinate system. The components of vector $\vec{X}$ are related to known position components X-Y-Z using conventional non-linear ephemeris equations. The non-linear ephemeris equations are then linearized using a finite-order Taylor Series to find linear equations that will relate the Keplerian parameters to each X-Y-Z position. Then a standard Least Squares method is used to solve the Keplerian parameters.

The Keplerian Solver program code 115 converts orbital samples into ephemerides from X-Y-Z satellite positions in ECEF frame. The ephemerides it outputs will each be valid for nine hours, e.g., four hours before its time-of-ephemeris (TOE) and five hours after the TOE.

The Keplerian Solver program code 115 stores orbit integration data into a very compact ephemeris format, e.g., three days worth of LTCSM data compacts into less than twenty kilobytes.

The Keplerian Solver program code 115 can commence operation after only a single observation of the ephemeris has been obtained for each corresponding SV 102. As little as one X-Y-Z position sample per hour is all that is necessary to support the functioning. This means for an eight hour model, no more than nine samples are needed per SV 102.

An updating process 116 schedules when processing time on the limited-capability microcomputer 108 should be used to compute new LTCSM's. Such LTCSM processing can be in background while normal position solutions are actively being provided to a user, or as a residual process that continues after the user requests a power shut down. During satellite tracking of SV's 102, it cannot be known if the currently in-hand SV ephemeris will be the last one that will be available before power is shut down. There is no point in computing an LTCSM if a later ephemeris will be forthcoming. But, an opportunity is missed if the ephemeris on-hand is not used to start the long-term prediction process and a shut-down intervenes.

The updating process 116 can also give priority to building models to optimize LTCSM availability at some expected time in the near future. Users often subject their appliances like GPS receivers to repetitive patterns of use during certain times of day. For example, turning on a GPS receiver for the morning commute to work and the evening commute home. Then every morning commute, the updating process 116 would make sure the LTCSM's needed for that evening are ready before allowing the power to be turned off completely. And in the evening, the LTCSM's for the next morning are computed by updating process 116. The updating process 116 could build for only these times. The advantage might be that fewer models are computed. But all models need to be carried forward anyway, so in the end, there is little benefit to prioritization. But if the calculation times were being minimized, and the calculations were only done in certain time windows, then the necessary LTCSM's could be on-hand for just those times.

It would be best not to waste computing resources and time calculating any LTCSM's just because a new ephemeris was decoded. In one basic embodiment of the present invention, the LTCSM's for satellite vehicles 102 are computed in order of their pseudorandom number (PRN) code division multiple access (CDMA) keys, e.g., PRN-1 to PRN-32. But, it may be better to compute the LTCSM's in reverse "highN" order, meaning computations are made first for those satellite vehicles 102 that are presently on the opposite side of the earth from the navigation receiver and user position. Those LTCSM's will not be recalculated anytime soon because no new ephemeris will be forthcoming. This method would, of course, make the required state-machine more complex, but not impossibly so. Such reverse highN order is still valid to do when a fix session is off and in the case where the next power-on occurs before calculations are complete.

A LTCSM library 118 is thus built up and maintained to support future navigation solution processing 120. Flash memory can be used as a storage device for the LTCSM library 118. Such LTCSM library 118 will eventually have a functional LTCSM saved for each and every SV in a future constellation of SV's 122 that can present itself in the next several days. The solutions computed in the future without having immediate access to nothing more than the pseudoranges from SV's 122 comprise position fixes 124. The navigation messages need not be demodulatable, and so a high sensitivity mode of operation is therefore also enabled. A fast time-to-first-fix (TTFF) is a principal advantage.

In a server based extended ephemeris network connected device, a long-term compact model reconstruction unit is supported by a host platform. Processing produces current ephemerides and clock estimates in a ICD-GPS-200 type 15-parameter format. The host platform processing strips off the Internet protocol format to extract data that fits better with the GPS receiver. An eRide (San Francisco, Calif.) PVT receiver, for example, receives data in NMEA ASCII format so the Internet packet payload is extracted and converted to an ASCII payload. An eRide MP receiver can receive the data directly from the host in response to a function call. The host translates the Internet format into the native format of the MP client software.

Here, the fully autonomous extended ephemeris GPS navigation receiver 100 of FIG. 1 has no such network connection or server available to it.

As for the satellite clock models, the last observed clock model is always used. This is referred to herein as a hybrid model. In this case, even if a new ephemeris is collected that does not trigger a new self-ephemeris, its clock model is saved and is used when any self-ephemeris is extracted from memory and applied to position fixes. The overall position and clock is still considered a compact or reduced ephemeris as the $2^{nd}$ order satellite clock coefficient is ignored.

Referring now to LTCSM library 118, no one long-term model can be used to describe the satellite orbit or clock for an entire week into the future with sufficient accuracy for position fixing. The orbit and clock are just too complex. Therefore, the period of a week into the immediate future is divided into three, eight-hour segments for each of seven days and given a one hour buffer at the beginning and ending, e.g., twenty-one ten-hour long-term models 311-333 for every possible GPS satellite. These are forwarded after the four-hour short-term satellite model 310 is sent, and they are optimized for memory storage. Eight-hour segments provide a good tradeoff of fit error to a calculated orbit that does not contribute errors beyond the error of the orbit.

Clock information is used to update or replace clock predictions as the opportunities arise. Any clock predictions included in the ten-hour long-term models tend to degrade much faster than do the orbit predictions. If it is possible to obtain the latest clock model, that model could be stored in LTCSM library 118. But, some applications may not want to do this because it degrades how often the flash memory would be written and erased. Such would supersede any clock model previously computed and can be stored in non-volatile memory.

Spacecraft orbits are predictable because well-known forces act them on. But the satellite clocks are derived from atomic clock standards, and will have random perturbations that are next to impossible to predict. For this reason, it is best to update the clocks whenever possible with the most recently observed ephemeris based clock model at the time of computing each LTCSM. Even if a lot of effort is made to improve the clock model fit, the resulting clock predictions did not usually yield an overall statistical improvement over not predicting at all.

One limited-capability microcomputer 108 that has provided good results and that is affordable in the intended applications is the so-called ARM-9 running at 54-MHz with an on-board cache memory and program memory in flash devices. Such permitted extended ephemerides to be computed for thirty-two SV's for three days into the future with about six hours of processing time. This can also be distributed across two hours of processing per day for three days.

Referring now to FIG. 2, a satellite navigation receiver 200, like that of FIG. 1, includes a radio frequency (RF) stage 202, a digital signal processing (DSP) stage 204, an ARM-9 processor core 206, a temperature controlled crystal oscillator (TCXO) 208, and a flash memory 210. All of these have their operating power separately controlled by a scheduler 212 in response to user on/off power requests. In mobile type receivers, a battery 214 supplies all of the operating power. Scheduler 210 is directed by updating process 116 (FIG. 1).

FIG. 3 represents with a graph 300 how a typical user will turn on their satellite navigation receiver 200 on for a sort while, get a few position fixes, and then turn it off. If a particular navigation session 302 is too short to compute (in background) a sufficient bank of extended ephemerides, then when the user requests a power down, RF and DSP stages 202 and 204 will be cut off, but not the other component stages needed to compute the remaining necessary extended ephemerides. A "compute LTCSM's" session 304 is allowed to carry on the calculations, e.g., the orbit integration, coordinate transformations, and Keplerian solver.

Only those extended ephemerides that cover the next few hours need to be computed. Computing days or weeks into the future may be a waste of effort given the user may come back in only a few minutes and request a power on. In a typical hardware implementation, the RF stages 202 can consume 15-mA of power, the DSP stage 204 30-mA, the ARM-9 stage 206 needs only 5-mA, the TCXO stage 208 uses 3-mA, and the flash memory 210 needs 2-mA. So the background processing can be done with relatively very little power consumption from a battery. Using a one-volt core this adds up to ten-milliwatts.

One policy that can be employed for updating process 116 and scheduler 210 is to not do any updating of the LTCSM library 118 until the user requests that power be cut off. Then, those LTCSM's that can be computed are calculated during compute LTCSM's session 304. The risk with such a policy is the user may not power down for a very long time. Then the entire LTCSM library 118 or parts of it could get out-of-date. In order to mitigate that risk, a limitation is imposed on the maximum time that is permitted to elapse since the last update of LTCSM library 118, and the calculations are carried on in background mode during navigation session 302. Alternatively, the various constituent LTCSM's can be inspected for the times that they will expire, and then an update is scheduled to beat those deadlines.

A navigation session 306 represents one that depends, at least in part, on there being viable LTCSM's in the LTCSM library 118 that would allow navigation process 120 to provide position fixes 124 in spite of some current ephemerides not being immediately available from SV's 122.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the scope of the invention.

What is claimed is:

1. An extended ephemeris satellite navigation receiver for receiving microwave transmissions from orbiting navigation system satellites, and for demodulating navigation messages that include the ephemerides for those navigation system satellites, comprising: storage for storing a force model modeling accelerations acting on multiple different satellite vehicles (SV), in accordance with which a single observation of the ephemeris for an SV is input and propagated days into the future by integrating that SV's orbital position with its corresponding force model; a processor for processing ephemeris observations in accordance with the force model to obtain extended ephemeris predictions that can be used as substitutes when said navigation messages from respective SVs cannot otherwise be immediately obtained and demodulated; a Keplerian solver program for execution by the processor that receives a series of future predicted X-Y-Z type SV position samples in an earth-centered, earth-fixed (ECEF) coordinate system and thereafter computes estimates for the Keplerian parameters $\vec{X}$=[a, e, i0, M0, Δn, di/dt, ω, Ω0, $\dot{\omega}$, Crs, Crc, Cus, Cuc, Cis, Cic] or a subset thereof that fit the series of X-Y-Z type SV position samples; wherein the processor is configured to store in local memory satellite models derived from the estimates for the Keplerian parameters, the satellite models comprising satellite models for a plurality of future days, further comprising a plurality of satellite models for each of said days.

2. The extended ephemeris navigation receiver of claim 1, further comprising: an orbit integration algorithm program for execution on the processor and configured to: 1) calculate acceleration of an SV at at least one point within an integration interval; and 2) calculate a state vector of the SV.

3. The navigation receiver of claim 2, further comprising: a scheduler for managing when code of the orbit integration algorithm program will be scheduled for execution on the processor, and for running said execution in foreground or background, and for controlling operating power supplied to various parts of the hardware of the navigation receiver to conserve power.

4. The navigation receiver of claim 1, further comprising: a coordinate transformation program for execution by the processor; wherein, the ECEF coordinate system and the International Celestial Reference Frame (ICRF) coordinate system are used in orbit integration calculations; wherein, coordinate transformations of ECEF to ICRF comprise four quaternion rotations, and a polar motion rotation quaternion based on Earth Orientation Parameters (EOP).

5. The navigation receiver of claim 4, further comprising: a device to acquire and use an up-to-date EOP sinusoidal polynomial for said polar motion rotation quaternion.

6. An extended ephemeris navigation receiver, comprising: a satellite navigation receiver for receiving microwave transmissions from orbiting navigation system satellites, and for demodulating navigation messages that include the ephemerides for those navigation system satellites; a microcomputer disposed in the satellite navigation receiver; storage for storing a force model modeling accelerations acting on a multiple different satellite vehicles (SVs), in accordance with which a single observation of the ephemeris for an SV is input and propagated days into the future by integrating that SV's orbital position with its corresponding force model; an orbit integration program for execution on the microcomputer, configured to: 1) calculate acceleration of an SV at at least one point within an integration interval; and 2) calculate a distance from a gravitational body to the SV a Keplerian solver program for execution on the microcomputer, and that receives a series of future predicted X-Y-Z type SV position samples in an earth-centered, earth-fixed (ECEF) coordinate system and thereafter computes estimates for Keplerian parameters $\vec{X}$[a, e, i0, M0, Δn, di/dt, ω, Ω0, $\dot{\Omega}$, Crs, Crc, Cus, Cuc, Cis, Cic] or a subset thereof that fit the series of X-Y-Z type SV position samples; a coordinate transformation program for execution by the microcomputer wherein two coordinate systems are used in orbit integration calculations, and coordinate transformations of ECEF to International Celestial Reference Frame (ICRF), and ECEF to ICRF, comprise four quaternion rotations, and a polar motion rotation quaternion based on Earth Orientation Parameters (EOP); a scheduler for managing when the orbit integration algorithm program code will be scheduled for execution on the microcomputer, and for running said execution in foreground or background, and for controlling operating power supplied to various parts of hardware of the receiver to conserve power; and a device to acquire and use an up-to-date EOP sinusoidal polynomial for said polar motion rotation quaternion wherein the microcomputer is configured to store in local memory satellite models derived from the estimates for the Keplerian parameters, the satellite models comprising satellite models for a plurality of future days, further comprising a plurality of satellite models for each of said days.

7. The navigation receiver of claim 1, wherein the processor is configured to select from a series of a large number of future predicted X-Y-Z type SV position samples a series of a small number of selected future predicted X-Y-Z type SV position samples to be used by the Keplerian solver.

8. The navigation receiver of claim 7, wherein the selected future predicted X-Y-Z type SV position samples correspond to SV positions at one-hour intervals.

9. The navigation receiver of claim 1, wherein the processor is configured to obtain the future predicted X-Y-Z type SV position samples by performing force integration according to the force model.

10. The navigation receiver of claim 9, wherein the future predicted X-Y-Z type SV position samples correspond to SV positions spaced apart by intervals of at least three seconds.

11. The navigation receiver of claim 9, wherein the processor is configured to perform force integration taking into account acceleration components attributable to the sun and the moon, wherein the acceleration components attributable to the sun and the moon are updated infrequently compared to a rate at which new future predicted X-Y-Z type SV position samples are computed.

12. The navigation receiver of claim 9, wherein the force model assumes block IIR mass and area for all SVs.

13. The navigation receiver of claim 1, wherein the processor is configured to perform transformation between coordinate systems using a forward Earth Oriented Parameter model.

14. An extended ephemeris satellite navigation receiver for receiving microwave transmissions from orbiting navigation system satellites, and for demodulating navigation messages that include the ephemerides for those navigation system satellites, comprising: storage for storing a force model modeling accelerations acting on multiple different satellite vehicles (SV), in accordance with which a single observation of the ephemeris for an SV is input and propagated days into the future by integrating that SV's orbital position with its corresponding force model; a processor for processing ephemeris observations in accordance with the force model to obtain extended ephemeris predictions that can be used as substitutes when said navigation messages from respective SVs cannot otherwise be immediately obtained and demodulated; a Keplerian solver program for execution by the processor that receives a series of future predicted X-Y-Z type SV position samples in an earth-centered, earth-fixed (ECEF) coordinate system and thereafter computes estimates for the Keplerian parameters $\vec{X}=[a, e, i0, M0, \Delta n, di/dt, \omega, \Omega 0, \dot{\Omega}, Crs, Crc, Cus, Cuc, Cis, Cic]$ or a subset thereof that fit the series of X-Y-Z type SV position samples; wherein the processor is configured to store in local memory satellite models derived from the estimates for the Keplerian parameters, the satellite models comprising satellite models for a plurality of future days, further comprising a plurality of satellite models for each of said days; wherein the processor is configured to select from a series of a large number of future predicted X-Y-Z type SV position samples a series of a small number of selected future predicted X-Y-Z type SV position samples to be used by the Keplerian solver.

15. An extended ephemeris satellite navigation receiver for receiving microwave transmissions from orbiting navigation system satellites, and for demodulating navigation messages that include the ephemerides for those navigation system satellites, comprising: storage for storing a force model modeling accelerations acting on multiple different satellite vehicles (SV), in accordance with which a single observation of the ephemeris for an SV is input and propagated days into the future by integrating that SV's orbital position with its corresponding force model; a processor for processing ephemeris observations in accordance with the force model to obtain extended ephemeris predictions that can be used as substitutes when said navigation messages from respective SVs cannot otherwise be immediately obtained and demodulated; a force model integration program for execution by the processor that, using fixed force parameters, and without regard to Keplerian parameters, determines a series of future predicted X-Y-Z type SV position samples in an earth-centered, earth-fixed (ECEF) coordinate system; a Keplerian solver program for execution by the processor that receives the series of future predicted X-Y-Z type SV position samples and thereafter computes estimates for the Keplerian parameters $\vec{X}=[a, e, i0, M0, \Delta n, di/dt, \omega, \Omega 0, \dot{\Omega}, Crs, Crc, Cus, Cuc, Cis, Cic]$ or a subset thereof that fit the series of X-Y-Z type SV position samples; wherein the processor is configured to store in local memory satellite models derived from the estimates for the Keplerian parameters, the satellite models comprising satellite models for a plurality of future days, further comprising a plurality of satellite models for each of said days.

* * * * *